April 19, 1966  A. B. SOMMERHOFF  3,246,412
APPARATUS FOR ILLUMINATION OF TRANSPARENCIES
Filed Oct. 23, 1962  3 Sheets-Sheet 1

INVENTOR
ALOYS B. SOMMERHOFF
BY
ATTORNEY.

April 19, 1966   A. B. SOMMERHOFF   3,246,412
APPARATUS FOR ILLUMINATION OF TRANSPARENCIES
Filed Oct. 23, 1962   3 Sheets-Sheet 2

INVENTOR
ALOYS B. SOMMERHOFF
BY
Paul M. Murphy
ATTORNEY.

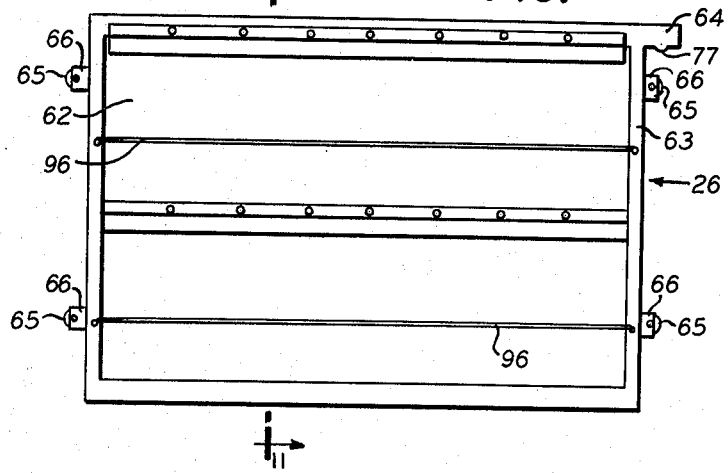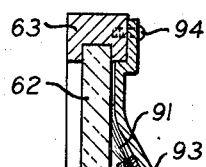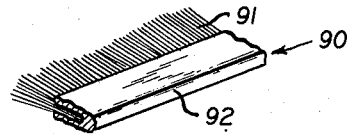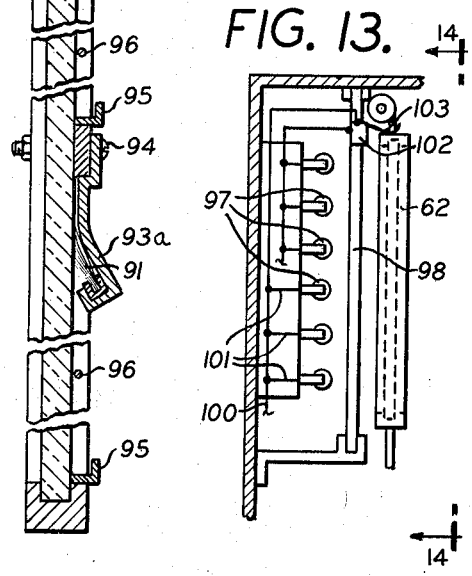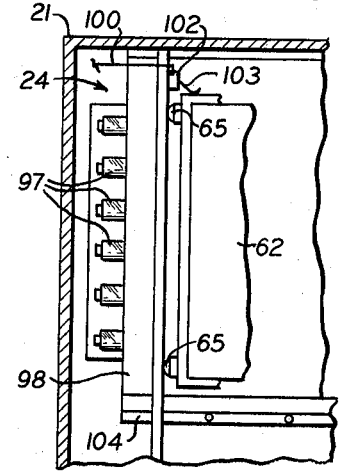

United States Patent Office 3,246,412
Patented Apr. 19, 1966

3,246,412
APPARATUS FOR ILLUMINATION OF TRANSPARENCIES
Aloys B. Sommerhoff, 59 Hardy Place, Yonkers, N.Y.
Filed Oct. 23, 1962, Ser. No. 232,478
6 Claims. (Cl. 40—106.1)

This invention relates to apparatus for illumination of transparencies, and has as its object to provide improved apparatus for this purpose.

The invention was occasioned by the need for improved apparatus for the displaying for study of X-rays, and, while the invention has general application for the illumination of transparencies, it will be described in particular with reference to use thereof in respect to X-rays.

A problem exists where, as in hospitals, several doctors utilize a single office for the viewing and studying of X-rays. The X-rays may be kept in file cabinets and withdrawn by or for individual doctors as they call at the office to examine X-rays for their patients. Following such withdrawal, the X-rays can be mounted on illuminating devices such as light diffusing, light transmitting panels mounted in front of bulbs for emitting light to illuminate the X-rays. Following mounting of the X-rays on the illuminating device and the studying thereof, they must be replaced in the files. This procedure requires, in order that the X-rays be retained in an orderly manner, the attendants of an assistant to take care of the filing of the films. As doctors will be calling at various times to view their X-rays, the procedure prescribed commonly required considerable time of an assistant responsible for the files.

The requirements for an assistant to attend the withdrawal and re-filing of X-rays can be reduced at least in part by providing a large number of illuminating devices so that the necessity for refiling in order to make room for other X-rays to be studied, is disposed of, thus where a large number of illuminating devices are used, the X-rays can be left on the illuminating devices until such time as it is convenient for the assistant to re-file them. This procedure, however, has the disadvantage of requiring a large number of illuminating devices and, therefore, requires the utilization of a large amount of office space for the devices.

A principal object of the invention is to provide a device for the viewing of X-rays which will obviate the necessity for continuous attendance of an assistant to withdraw and re-file X-rays, while at the same time providing the X-rays so that they will be readily and conveniently available to doctors, and, further, will require relatively small office space.

The manner in which this and other objects are attained, according to the invention, will be apparent from the following description of the invention taken in reference to the accompanying drawings, wherein:

FIG. 10 is an elevation view of a holder or framed panel for having mounted thereon transparencies or X-rays to be viewed;

FIG. 11 is taken on line 11—11 of FIG. 2;

FIG. 12 is a prospective view of a brush which can be used as a clamping means for securing X-rays in place on the holders therefor;

FIG. 13 is an end elevation view in cross-section of a modified form of the apparatus; and FIG. 14 is taken on line 14—14 in FIG. 13.

Figure 1:
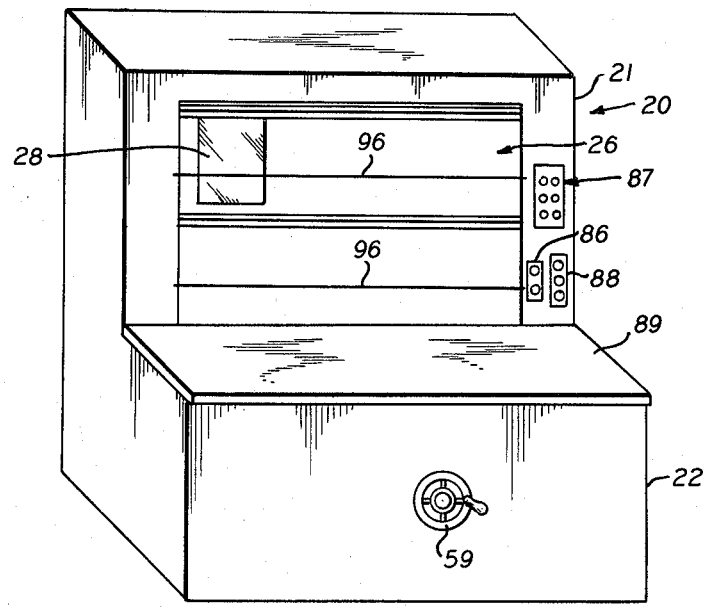
FIG. 1 is a prospective view of a device according to the invention.
Figure 3:
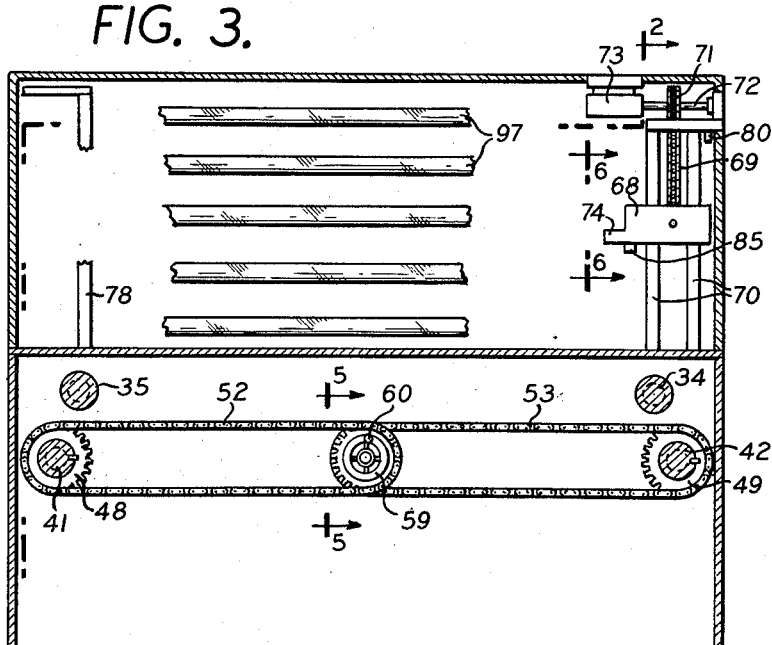
FIG. 3 is a front elevation view of the device as shown in FIG. 1 with the front panels of the device broken away.

According to the invention, apparatus for illumination of transparencies comprises an illuminating means which can be a plurality of bulbs, a magazine for the transparencies adjacent the illuminating means, removable transparency holders in the magazine, a holder mover for removing the holders from the magazine and moving them into viewing position with the transparencies carried thereby disposed for illumination by the illumination means. The magazine and illuminating means are movable relative to each other and, preferably the illuminating means is stationary and the magazine is movable. Further, means are provided for the relative movement of the magazine and illuminating means to selectively position each individual holder for engagement thereof by the mover to permit moving the holder by the mover into viewing position, and, further, means are provided for moving the magazine and holder relative to each other. In a preferred embodiment, track is provided for the movement thereon of the magazine and mechanical or electrical means are provided for moving the magazine over the track.

In a preferred embodiment of the invention, the illuminating means comprises a plurality of light emitting devices and the holder comprises light transmitting and diffusing plate adapted to have the transparencies mounted thereon. The holder mover moves the plates across the light ray paths from the light emitting devices upon moving the plates from the magazine to a position for viewing, and the apparatus includes switch means for inactivating light emitting devices remote from the magazine until the plates have moved across the light ray paths from said remote light emitting devices. For such an arrangement, with the magazine disposed below the light emitting devices, the plates can be stopped at an intermediate position with the upper part of a plate disposed in front of lower light emitting devices and X-rays on the upper part of the plate can be viewed with the plate in this position. The light emitting devices above the plate can then be in the off condition so that light from these devices will not interfere with the viewing of the X-rays on the upper part of the plate and in front of lower lights.

A feature of the invention is with respect to the clamping means provided for securing transparencies or X-rays in place on light diffusing plates as are used in X-ray display devices. According to the invention, the clamping means comprises a brush including a back and bristles, the bristles extend upwardly from the brush back and means are provided which press the bristles into engagement with the plate. Thus, a transparency can be mounted on the plate by pushing an upper edge portion thereof under the bristles.

Still another feature of the invention is the provision in an illuminating device wherein the light emitting means comprises a plurality of bulbs, of a light diffusing plate fixedly positioned in front of the bulbs, and a second plate for positioning in front of the light diffusing plate and for the mounting thereon of the transparencies. Each of the plates transmits light from the light emitting source and the second mentioned plate as well as the first mentioned plate can be, and preferably is, a light diffusing plate. This construction provides the advantage that the required depth or thickness of the device (that is the distance from the plane on which the transparencies are disposed for viewing and the light emitting devices) is substantially reduced. This distance must be such that an outline of the bulbs or other light emitting devices is not seen through the plates, and, it has been found that a utilization of two plates, as described, substantially reduces the required spacing.

In the various views of the drawings, light reference characters refer to corresponding parts.

The device illustrated in FIGS. 1–12 includes a cabinet 20 having an upper portion 21 and a lower portion 22. Magazine 23 is housed in the lower part 22 and a light emitting means in the form of light bank 24 is housed in the upper part 21. The magazine houses several transparency holders which in the embodiment illustrated are framed light transmitting and diffusing plates 26. Means, shortly to be described, are provided for moving the magazine, and a mover or truck 27 is provided for raising the panels 25 from the magazine to in front of the light emitting devices 24 whereby a framed panel can be moved to in front of the light emitting devices and, as is illustrated in FIG. 1, an X-ray 28 mounted on the panel 26 can be viewed.

Figure 2:
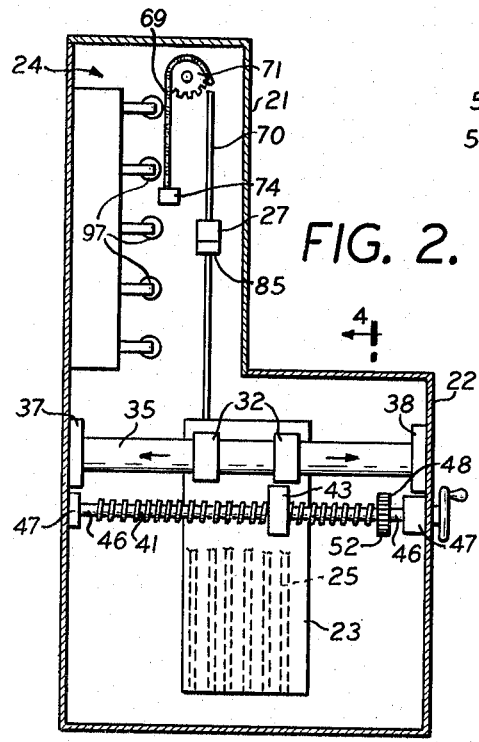
FIG. 2 is a cross-sectional view taken on line 2—2 of FIG. 3.
Figure 5:
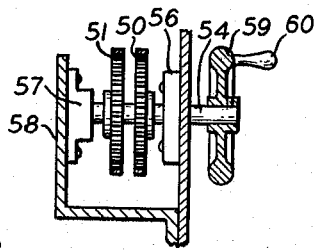
FIG. 5 is a view taken along line 5—5 in FIG. 3 and showing the means provided for moving the magazine.
Figure 4:
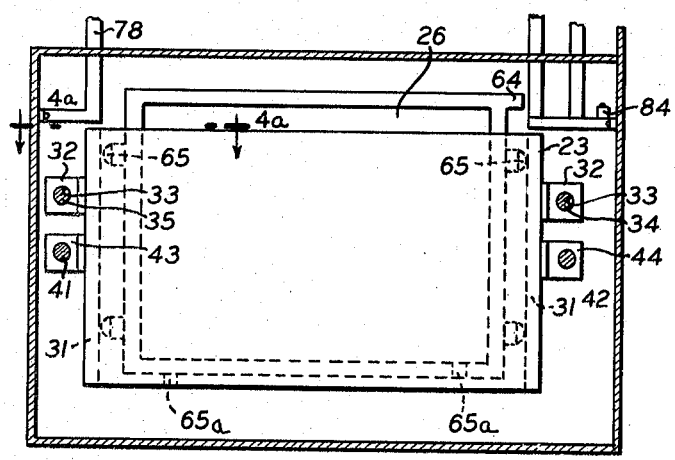
FIG. 4 is a view taken along line 4—4 in FIG. 2.
Figure 8:
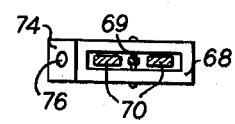
FIG. 8 and FIG. 9 are taken, respectively, on lines 8—8 and 9—9 in FIG. 7.
Figure 9:
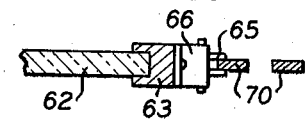
Figure 4A:
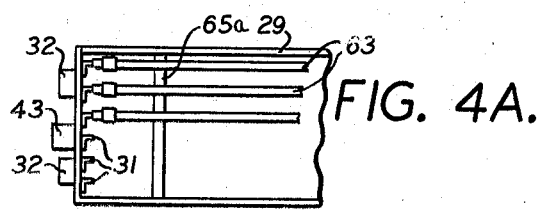
FIG. 4A is a plan view of the magazine of the device taken along line 4A—4A in FIG. 4.

The magazine 23 can be best seen in FIG. 2, FIG. 4, and FIG. 4A. The magazine comprises an upstanding enclosure 29 which has an open top and has secured to the sides thereof the angle irons 31. Mounting bosses 32 are secured to each side of the magazine and are each provided with a bore 33. The mounting bosses 32 on the respective sides of the magazine receive the track shafts 34 and 35. The track shafts 34 and 35 are secured to the cabinet by collars 37 and 38 and provide a track on which the magazine runs. The mounting bosses 32 are slidably mounted on the track shaft 35 and 34.

For controlling the movement of the magazine over the track, threaded shafts 41 and 42 are provided and these are received, respectively, in the threaded bosses 43 and 44 which are fixedly mounted on the sides of the magazine. The threaded shafts 41 and 42 each have end necks 46 which are received in collars 47 mounted on the front and rear panels of the cabinet 1. The necks 46 are freely turnable in the collars 47. Shafts 41 and 42 are provided, respectively, with driven gears 48 and 59, the said driven gears being keyed to their respective shafts (see FIG. 3). The driven gears 48 and 49 are connected, respectively, to drive gears 50 and 51 (see FIG. 5) by, respectively, chains 52 and 53. The drive gears 51 and 52 are fixedly mounted on drive shaft 54 which is freely turnable in the mounting collars 56 and 57. The mounting collar 57 is fixedly secured to bracket 58 which, in turn, is secured to the front panel of the cabinet 1. A hand wheel 59 having a handle 60 is fixedly mounted on the drive shaft 54. By operation of the hand wheel, the chains 52 and 53 can be driven to, in turn, drive the driven gears 48 and 42, and thereby, the threaded shafts can be turned so as to move the magazine over the tracks 34 and 35.

Figures 6, 7:
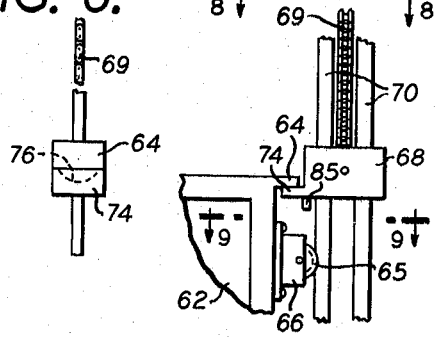
FIG. 6 is a view taken along line 6—6 in FIG. 3 and showing a part of the mover or truck provided for lifting the transparency holders from the magazine.
FIG. 7 is an elevation view showing the mover or truck operatively engaged with one of the transparency holders.

The holder for the transparencies or X-rays is best seen in FIG. 10. As there shown, the holder comprises a light diffusing and light transmitting panel 62 as is known in part for transparency displaying devices, and this panel is secured in a frame 63. The upper right-hand corner of the frame has an extension which provides the arm 64 which is for service, as is shortly to be described, for raising and lowering the outer or framed panel from and into the magazine. Each frame is provided with wheel guides 65 which are rotatably mounted in the wheel mounts 66. These wheels are grooved (as is illustrated in FIG. 7) to receive the tracks. In the magazine 23, as can be best seen in FIG. 4A, the wheels ride on the out-turned ends of the angle irons 31, the said out-turned ends serving as tracks in the magazine.

The mover or lift for raising and lowering the framed panels from and into the magazine can be best seen in FIGS. 2–4 and 6–9. A car 68 is mounted on chain 69 and drive means are provided for the chain 69 to move the car up and down over the car tracks 70. The chain 69 extends upwardly from the car 68 and passes over drive gear 71 which is mounted on shaft 72, the shaft 72 being driven by the motor 73. The chain passes over the drive gear and terminates in a free end which has mounted thereon a counterweight 74. The motor is adapted to drive the drive gear in either direction and hence is suited to raise or lower the car 68. The car 68 is provided with an outwardly extending lift lug 75 which is proportioned to engage the arm 64 of each of the framed panels 62 (see FIG. 7, wherein the car is shown in a position intermediate the raised and lower positions thereof). As can be best seen from FIG. 6, and FIG. 10, the lift lug 74 is provided with a detent 76 for receiving the lobe 77 on the arm 64 of the framed panel 62.

As can be best seen in FIG. 4, the tracks 70 on which the car 68 rides, terminate, at their lower end, just above the upper extremity of the angle irons 31 which provide track for the wheels 65 on the framed panels 62, and the lower end of the tracks 70 is adjacent the upper end of the angle iron track 31, whereby the wheels 65 of the framed panels 62 can be transferred from the angle iron track to the car tracks. To facilitate the upward and downward movement of the framed panels 62, track 78 is provided to receive the wheels 65 on the side of the framed panel opposite the side adjacent to which the car 68 is disposed, and the track 78 receives the adjacent wheels 65 in the manner that the track 70 receives its adjacent wheels 65.

In operation of the apparatus, the magazine 23 can be moved to the extreme forward position, and the car 78 can then be lowered by operation of the motor 73 to its lowermost position wherein its lift lug 74 is below the level of the arms 64 projecting from the upper right-hand corner of the framed panels 62. The magazine can then be moved forward to selectively position any one of the framed panels carried thereby so that its arm 64 is disposed over the lift lug 74 of the car 68. Thereupon, the motor 73 can be actuated to cause the chain 69 to lift the car 68. The lift lug 74 will then engage the arm 64 of the panel frame and lift the panel frame upwardly to a viewing position in front of the light emitting devices 24 (FIG. 2). And in this operation, the wheel 65 will transfer from the angle iron track 31 in the magazine 23 to the car track 70 and the track 78. The panel frames 62 can be lowered into the magazine by reversing the action of the motor 73.

Various electrical control systems can be employed. The control system can include an upper limit switch 80 (FIG. 3) to engage the car 68 at a desired upward limit of travel and to deactivate the motor 73 upon actuation of the switch 80 in response to abutment therewith by the car 68; a lower limit switch (see FIG. 4) 81 to similarly limit the downward movement of the car 68; and the car 68 can have mounted thereon a feeler switch 85 which will serve to deenergize the motor 73 should the feeler switch 85 engage one of the arms 64 of the panel frames 62 as would occur upon lowering of the car towards its lowermost position when a panel frame is so disposed that an arm 64 thereof would interfere with the movement of the car 68 to its lowermost position. Further, the apparatus can include an on-off switch 86, an indicating device 87 for indicating the panel frame which is in position to be actuated by the car 68, and a raise-lower-stop switch 88. Also, it will be appreciated, that instead of manual operation for movement of the magazine fore and aft, electrical operation can be provided.

It will be observed that the arrangement as described above and as depicted in FIGS. 1–3 of the image provides for the disposition of the magazine below the level at which the transparencies are viewed, and this permits providing a course for travel of the magazine so that a counter 89 (FIG. 1) can be provided in front and just below the framed panels when in the viewing position. This facilitates study of the X-rays.

A feature of the invention, which can be best seen in FIGS. 10–12, is the means provided for clamping transparencies or X-rays on the framed panels 62. Thus, according to the invention, the clamping means can be a brush 90 including the bristles 91 and back 92, and, as can be best seen in FIG. 11, the brush can be held by a brush holder 93 so that the bristles 91 extend upwardly and are pressed into engagement with the panel 62, and the brush holder 93 can be secured to the frame 63 by screws 94.

The brush holder 93 is removably secured to the framed panel 62 by screws 94. When it is desired for any reason to replace the brush, the holder can be removed for insertion of a new brush, and the holder can then be replaced.

To insert a transparency such as an X-ray in the brush clamp 90, the X-ray can be snapped so that the upper edge portion thereof slides under the bristles. Upon release of the X-ray, the bristles will hold the X-ray in place on the panel 62. The brush can advantageously be a nylon brush.

As indicated in FIGS. 10–11, the framed panel can advantageously be of such size that two rows of X-rays can be mounted thereon and at an intermediate height of the panel, a second brush holder 93A can be mounted. Further, the panel frame 63 can include the lip members 95 for receiving the lower edge portion of X-rays. Also, the framed panels can include the wires 96 disposed intermediate the brushes 91 and the lips 95, and the X-rays can be disposed between the wires 96 and the panel 62, whereby the wires 96 serve to maintain the X-rays in place.

Further features of the invention are indicated in FIGS. 13 and 14. According to the invention, particularly wherein the light emitting means is a plurality of bulbs 97 such as fluorescent bulbs as are commonly used in X-ray display devices, it has been found to be advantageous to include a fixedly positioned light diffusing and light transmitting panel 98 in front of the bulbs, this panel 98 being in addition to the framed panel 62. Each of these panels can be a light diffusing and light transmitting panel. The advantage realized by using two panels including one fixedly positioned panel is that the required depth for the apparatus can be thereby reduced. Thus, the apparatus must be of sufficient depth so that the image of outline of the bulbs or light concentrations from the bulbs does not show through the light diffusing and transmitting panel. It has been found that if two panels are used, as is represented in FIGS. 13 and 14, the required depth for the equipment can be substantially reduced. This improvement has general application to transparency viewing devices regardless of whether the panel on which the transparencies are mounted is movable. Thus, in devices wherein the panel on which the transparencies are mounted for viewing is fixedly positioned in front of the light emitting means, the required depth for the X-ray viewing device can be substantially reduced by employing, according to the invention, a second light diffusing panel disposed between the light emitting source and the panel on which the transparencies are mounted.

The extent to which the use of two light diffusing panels, according to the invention, reduces the required depth of the viewing or display part of the device can be appreciated from the following. Commonly, where a single panel is used, the spacing between bulbs and panel necessary in order to avoid the appearance of the bulb through the panel, is about 3 inches. Where two panels are used, according to the invention, a spacing between bulbs and first panel of about ¼ inch, and between first and second (outer) panel of about ½ inch can be used. Allowing about ¼ inch for the thickness of the panels, the comparison there is 3 inches where a single panel is used and 1 inch where two panels are used. The two panel construction of the invention requires somewhat increased lighting capacity, for example, 20–25% more, but this is offset by the advantage of reduced depth requirement.

The panels can be of known so-called frosted glass or frosted plastic. Lucite brand, No. 2447, has been found particularly well suited for the purposes of the invention.

Another feature of the invention is the provision of means for controlling the light emitted means so that should it be desired to stop the frame panel at a level below its uppermost level to provide the panel in an intermediate position for study if X-rays mounted thereon, the light emitting means above the panel in such intermediate position will be off, whereby light from the upper emitting means will not interfere with study of the X-rays. This embodiment of the invention has application whether one or two light diffusing panels are employed, though it finds its greatest advantage where a single light diffusing panel is employed. As is illustrated in FIG. 13 and FIG. 14, power supply line 100 is connected to the lower bulbs by branch lines 101, and the upper bulbs are connected to the power supply line 100 through the switch 102. The switch 102 has a finger 103 disposed for engagement by the frame panel 62. The upper lights of the lights 97 are not energized unless the framed panel 62 engages the finger 103 of swich 102. Thus, the upper lights are energized only if the framed panel 62 is in its uppermost position. In this manner, provision is made for stopping at an intermediate point, and, in this condition, the upper lights of the lights 97 are not lit so that an X-ray mounted for viewing with the frame panel 62 in an intermediate position can be studied without the upper lights being on.

What is claimed is:

1. Apparatus for illumination of transparencies comprising:
    (a) illumination means comprising a plurality of vertically spaced light emitting devices for providing a field of light in the area in which the transparencies are to be viewed;
    (b) a movable magazine for the transparencies adjacent and vertically spaced from the illuminating means;
    (c) removable light diffusing plates in the magazine;
    (d) a plate mover for removing the plates from the magazine and moving them vertically into viewing position in front of the illuminating means;
    (e) means for securing transparencies on the side of each plate remote from the illuminating means with the plate in viewing position;
    (f) track for the magazine providing a magazine course disposed for travel of the magazine to selectively position each individual plate for engagement thereof by the mover to permit moving the plate by the mover into viewing position;
    (g) means for moving the magazine over said track for selective positioning as aforesaid; and
    (h) switch means for inactivating light emitting devices remote from the magazine while light emitting devices adjacent the magazine are energized, prior to movement of the plate to in front of said remote light emitting devices.

2. Apparatus according to claim 1, said means for securing transparencies on one side of the plates comprising a brush including a back and bristles, the bristles extending upwardly from the brush back, and means pressing the bristles into engagement with the plate, whereby a transparency can be mounted on the plate by pushing an upper edge portion thereof under the bristles.

3. An apparatus according to claim 2, said securing means further comprising a ledge secured to the plate spaced from and below the brush, said ledge being positioned to have a lower edge portion of a transparency engaged by the brush, rest thereon.

4. Apparatus for viewing of transparencies, comprising an illuminating means, a transparency holder for disposition in front of the illuminating means, said transparency holder comprising a light diffusing plate, and clamping means mounted on the holder for securing the transparencies in place on the plate, said clamping means comprising a brush including a back and bristles, the bristles extending upwardly from the brush back, and means pressing the bristles into engagement with the plate, whereby a transparency can be mounted on the plate by pushing an upper edge portion thereof under the bristles.

5. Apparatus according to claim 4, said clamping means being mounted on the side of the plate opposite the illuminating means.

6. Apparatus according to claim 4, said clamping means further comprising a ledge secured to the plate and spaced from and below the brush, said ledge being positioned to have a lower edge portion of the transparency engaged by the brush, rest thereon.

References Cited by the Examiner
UNITED STATES PATENTS

| | | | |
|---|---|---|---|
| 963,336 | 7/1910 | Tas | 40—65 |
| 1,989,803 | 2/1935 | Hoben | 40—106.1 |
| 2,107,738 | 2/1938 | Klaus | 40—106.1 |
| 2,530,821 | 11/1950 | Hubbell | 40—10 |
| 2,943,410 | 7/1960 | Haggar | 40—106.1 |
| 3,055,131 | 9/1962 | Novak | 40—36 |

EUGENE R. CAPOZIO, *Primary Examiner.*

JEROME SCHNALL, *Examiner.*